United States Patent
Moss et al.

(10) Patent No.: US 11,243,323 B2
(45) Date of Patent: Feb. 8, 2022

(54) BURIED WELLBORE LOCATION FROM SURFACE MAGNETIC MEASUREMENTS

(71) Applicant: Scientific Drilling International, Inc., Houston, TX (US)

(72) Inventors: Clinton Moss, Edmonton (CA); Douglas Ridgway, Edmonton (CA)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 0 days.

(21) Appl. No.: 16/525,109

(22) Filed: Jul. 29, 2019

(65) Prior Publication Data
US 2020/0041681 A1 Feb. 6, 2020

Related U.S. Application Data

(60) Provisional application No. 62/713,860, filed on Aug. 2, 2018.

(51) Int. Cl.
*G01V 3/08* (2006.01)
*G01V 3/38* (2006.01)
*E21B 47/092* (2012.01)

(52) U.S. Cl.
CPC ............ *G01V 3/087* (2013.01); *E21B 47/092* (2020.05); *G01V 3/38* (2013.01)

(58) Field of Classification Search
CPC ........ E21B 47/00; E21B 47/09; E21B 47/092; G01V 3/10; G01V 3/38; G01V 3/087; G01V 3/083; G01V 3/086; G01V 3/26; G01V 3/08; G01V 11/002; H01V 11/00
See application file for complete search history.

(56) References Cited

U.S. PATENT DOCUMENTS

| | | | |
|---|---|---|---|
| 5,410,252 A * | 4/1995 | Potter | G01V 3/087 324/345 |
| 5,512,830 A | 4/1996 | Kuckes | |
| 5,629,626 A * | 5/1997 | Russell | G01V 3/08 324/226 |
| 5,892,362 A * | 4/1999 | Warren | G01V 3/28 324/339 |

(Continued)

OTHER PUBLICATIONS

International Search Report and Written Opinion issued in PCT App. No. PCT/US19/43953, dated Oct. 25, 2019 (11 pages).

*Primary Examiner* — Huy Q Phan
*Assistant Examiner* — Dustin R Dickinson
(74) *Attorney, Agent, or Firm* — Locklar PLLC

(57) ABSTRACT

A method for locating a buried casing stub may comprise a) identifying a target region, b) providing at each of a plurality of survey points in the target region a casing stub locator that includes a vector magnetometer, c) measuring the magnetic field at each of the survey points using the vector magnetometer so as to generate a plurality of magnetic field measurements, d) using the magnetic field measurements to generate a model of the magnetic field of the target region, e) fitting the model generated in step d) to a selected model of a magnetic anomaly created by the casing stub so as to generate model fit information (MFI), and f) locating the casing stub using the MFI. At each survey point, an expected Earth magnetic field can be subtracted from the measured magnetic field. A total station can measure the position and/or the azimuth of the package.

14 Claims, 7 Drawing Sheets

(56) References Cited

U.S. PATENT DOCUMENTS

| | | | |
|---|---|---|---|
| 6,508,316 B2 | 1/2003 | Estes et al. | |
| 6,698,516 B2 | 5/2004 | Van Steenwyk et al. | |
| 6,739,165 B1* | 5/2004 | Strack | G01V 3/083 |
| | | | 702/13 |
| 6,985,814 B2 | 1/2006 | McElhinney | |
| 7,952,357 B2 | 5/2011 | Cole | |
| 7,990,151 B2 | 8/2011 | Olsson et al. | |
| 8,564,295 B2 | 10/2013 | Olsson et al. | |
| 8,689,889 B2 | 4/2014 | Shoyhetman et al. | |
| 9,632,202 B2 | 4/2017 | Olsson et al. | |
| 9,696,447 B1 | 7/2017 | Olsson et al. | |
| 2013/0197891 A1* | 8/2013 | Jessop | G01V 3/081 |
| | | | 703/9 |
| 2016/0097272 A1* | 4/2016 | Moss | G01V 3/081 |
| | | | 324/346 |
| 2016/0291192 A1* | 10/2016 | Cuevas | E21B 47/13 |
| 2017/0371062 A1* | 12/2017 | Schmidt | E21B 43/20 |
| 2018/0038983 A1* | 2/2018 | Pai | G01V 3/16 |
| 2018/0329103 A1* | 11/2018 | Colombo | G01V 3/082 |

* cited by examiner

SURVEY POSITION (x)

BURIED WELLBORE LOCATION FROM SURFACE MAGNETIC MEASUREMENTS

CROSS-REFERENCE TO RELATED APPLICATIONS

This application is a non-provisional application which claims priority from U.S. provisional application No. 62/713,860, filed Aug. 2, 2018, which is incorporated by reference herein in its entirety.

TECHNICAL FIELD/FIELD OF THE DISCLOSURE

The present disclosure relates generally to wellsite operations and specifically to locating buried casing stubs.

BACKGROUND OF THE DISCLOSURE

When abandoning a well, wells are often plugged below ground level. Subsequently, the wellhead is cut off and the remaining casing stub is buried. In the event that intervention of the well is necessary, such as where a well is improperly plugged, the casing stub must be located so a proper abandonment can take place. However, records of the well may not include surface location data, requiring an operator to find the buried casing stub before attempting the intervention operation.

Typically, buried casing stubs are located using a scalar magnetometer on the surface to map the target region where the buried casing stub is located for magnetic anomalies. Mapping magnetometer readings to the location each is taken within the region may generate a "hot spot" map that indicates the distribution of magnetic perturbation across the target region. The area having the highest magnetic perturbation may generally indicate the location of the buried casing stub. However, any other magnetic material in the target region such as ferrous debris, well equipment, other wells, or other magnetic materials may also be measured during the mapping operation by the scalar magnetometer. Additionally, scalar magnetometer readings may not indicate the depth to which the target casing stub is buried.

SUMMARY

In some embodiments, a method for locating a buried casing stub may comprise a) identifying a target region for the buried casing stub; b) positioning a casing stub locator at a survey point in the target region, the casing stub locator including a vector magnetometer; c) measuring the magnetic field at the survey point with the vector magnetometer; d) moving the casing stub locator to a second survey point; e) measuring the magnetic field at the second survey point with the vector magnetometer; f) generating a model of the magnetic field of the target region using the magnetic field measurements from steps c) and e); g) fitting the model generated in step f) to a selected model of a magnetic anomaly created by the casing stub so as to generate model fit information; and h) locating the casing stub using the model fit information.

The method may further comprise defining a survey grid within the target region; moving the casing stub locator to each point of the survey grid; and measuring the magnetic field with the vector magnetometer at each point of the survey grid. The method may further comprise, for each measurement location: determining an azimuth relative to true north of the casing stub locator; using the azimuth and position of the casing stub locator to determine expected Earth magnetic field components of the measured magnetic field at that measurement location; and subtracting the Earth magnetic field components from the measured magnetic field at that measurement location. The method may further comprise positioning a total station at a location in the target region and measuring at least one of the position of the casing stub locator within the target region or the azimuth relative to true north of the casing stub locator with the total station. The method may further comprise determining the location of the total station in the target region using a positioning device. In some embodiments, the positioning device may be selected from the group consisting of differential GPS units, Global Navigation Satellite System units, or satellite navigation system receivers.

The azimuth relative to true north of the casing stub locator may be determined by visually aligning the casing stub locator to an external reference. The casing stub locator may further comprise one or more positioning devices adapted to locate the casing stub locating package within target region and determine the azimuth of casing stub locator and the positioning device may be a differential GPS unit. The casing stub locator may further comprise an accelerometer, and the method may further comprise determining the inclination of the casing stub locator with the accelerometer.

The method may further comprise identifying a ferrous object in proximity to the casing stub locator by comparing the measured magnetic field to an estimated magnetic field of the casing stub; and removing the ferrous object from the target region. The method may further comprise identifying a ferrous object in proximity to the casing stub locator by comparing the measured magnetic field to an estimated magnetic field of the casing stub; wrapping a wire around the ferrous object; connecting the wire to a current source; and demagnetizing the ferrous object by passing a current through the wire. The method may further comprise the steps of e1) measuring the magnetic field with the magnetometer in proximity to the demagnetized ferrous object and e2) including the measurement made in step e1) in the model generated in step f).

In some embodiments, a casing stub locating package for use in identifying a buried casing stub may comprise a tool body, a vector magnetometer, the vector magnetometer adapted to detect a magnetic anomaly created by the buried casing stub, an accelerometer, the accelerometer adapted to determine the inclination of the casing stub locating package, and a positioning device, the positioning device adapted to determine the position of the casing stub locator package in a target region.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
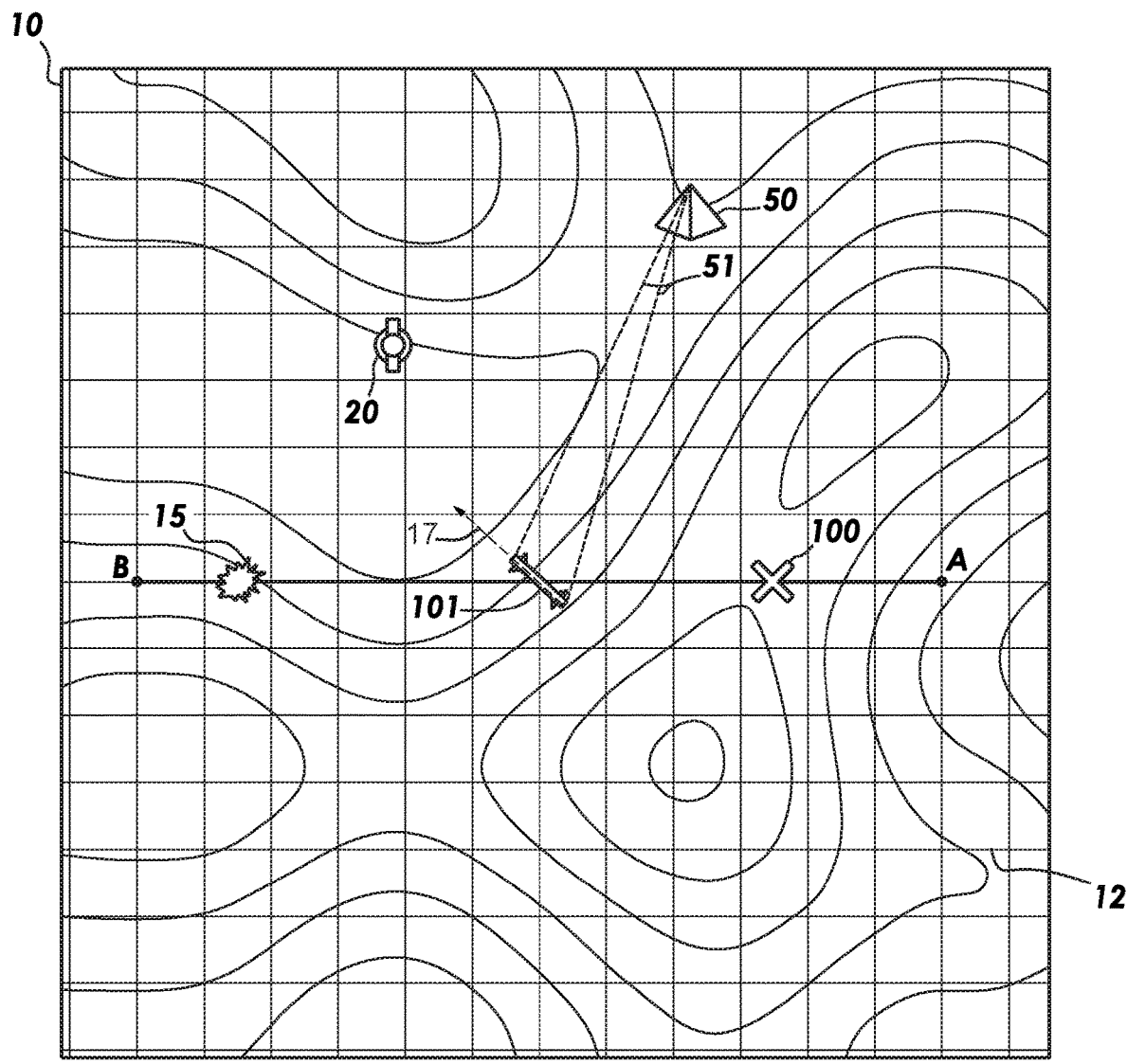
FIG. 1 depicts a target region having a buried casing stub and casing stub locator used in a surveying operation consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts buried casing stub 100, represented as an X located in target region 10. Buried casing stub 100 may, for example and without limitation, be the upper end of a length of casing of a previously abandoned wellbore. Buried casing stub 100 may therefore be formed from a ferromagnetic material such as steel and may create a local magnetic anomaly in the magnetic field within target region 10 about buried casing stub 100. Target region 10 may, in some embodiments, be identified as the general known location of buried casing stub 100 to be surveyed in order to locate buried casing stub 100.

In some embodiments, casing stub locator 101 may be brought to target region 10 and may be used in an operation to locate buried casing stub 100. As discussed further herein below, casing stub locator 101 may include one or more magnetometers adapted to measure the local magnetic field at the position in target region 10 at which casing stub locator 101 is located. Each such magnetic field measurement is referred to herein as a survey operation. Casing stub locator 101 may be repositionable within target region 10. In some embodiments, casing stub locator 101 may be iteratively moved from position to position such that a survey is taken at each point of a grid defined within target region 10, depicted in FIG. 1 as survey grid 12.

In some embodiments, a total station 50 or equivalent equipment may be positioned at a known location in target region 10 with a line of sight to casing stub locator 101. Total station 50 may be used, for example and without limitation, to define survey grid 12 and to position casing stub locator 101 within target region 10. In some embodiments, total station 50 may include one or more positioning devices including, for example and without limitation, a differential GPS unit, Global Navigation Satellite System unit, or satellite navigation system receiver to determine the precise location of total station 50 within target region 10. In some embodiments, as discussed further below, total station 50 may be used to measure the azimuth 17 of the long axis of casing stub locator 101 relative to true north before a survey operation is undertaken. In some embodiments, for example, total station 50 may include a laser-reflector device to locate casing stub locator 101 that uses one or more laser beams 51 to determine the relative distance between total station 50 and selected portions of casing stub locator 101, from which the azimuth 17 of casing stub locator 101 can be calculated.

In some cases, one or more magnetic or ferromagnetic objects may be located within target region 10. For illustration's sake, FIG. 1 depicts a movable ferrous object 15 and an unmovable ferrous object 20 located within target region 10. As an example, movable ferrous objects 15 may include, for example and without limitation, metal waste such as buried trash or garbage. Unmovable ferrous objects 20 may include, for example and without limitation, metal culverts, existing wellheads or wells, fences, or other such structures. Ferrous objects may cause anomalous magnetic field perturbations that may, for example and without limitation, interfere with the ability of casing stub locator 101 to locate buried casing stub 100 when a survey is taken in proximity to the ferrous objects.

Figure 2:
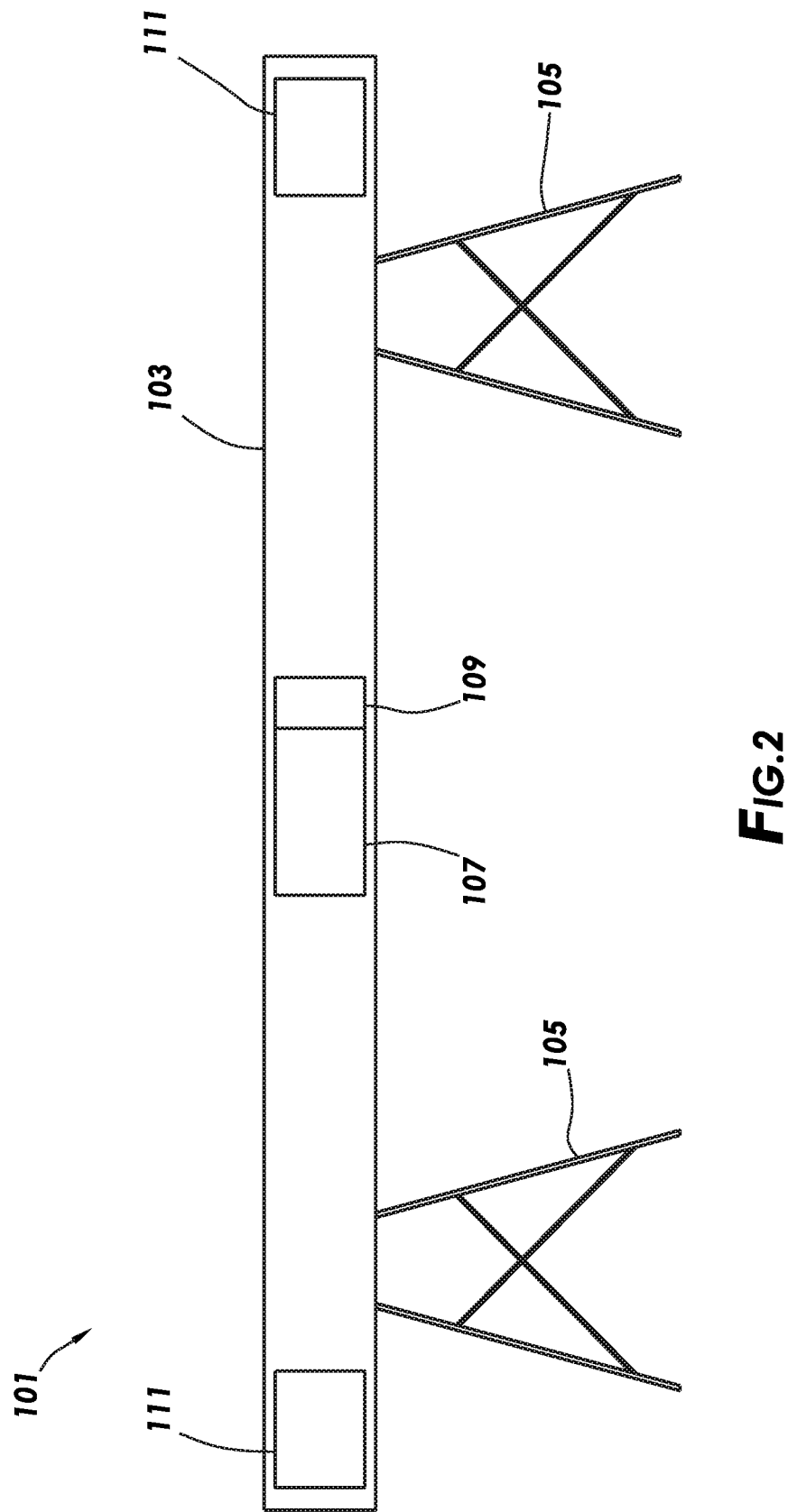
FIG. 2 depicts a casing stub locator consistent with at least one embodiment of the present disclosure.

In some embodiments, as depicted in FIG. 2, casing stub locator 101 may include tool body 103 and stands 105. Tool body 103 may house components of casing stub locator 101. Stands 105 may, for example and without limitation, support tool body 103 of casing stub locator 101 as it is used in survey operations. Casing stub locator 101 may include a vector magnetometer 107. Vector magnetometer 107 may measure the magnitude and direction of the magnetic field passing through casing stub locator 101. In some embodiments, vector magnetometer 107 may be a three-axis magnetometer. In some embodiments, casing stub locator 101 may also include one or more accelerometers 109. Accelerometers 109 may detect local acceleration due to gravity and may be used, for example and without limitation, to directly measure the inclination of casing stub locator 101 relative to a horizontal plane. In some embodiments, accelerometers 109 may be single or multi-axis accelerometers. In some embodiments, accelerometers 109 may include one or more three-axis accelerometers.

In some embodiments, casing stub locator 101 may include one or more positioning devices 111 positioned to accurately locate casing stub locator 101 in target region 10. In some embodiments, positioning devices 111 may be positioned at each end of tool body 103 such that the azimuth 17 of casing stub locator 101 can be determined. In some embodiments, positioning devices 111 may each include, for example and without limitation, one or more differential GPS units, Global Navigation Satellite System units, or satellite navigation system receivers. In such an embodiment, the azimuth 17 and position of casing stub locator 101 may be determined without need for other tools. Additionally or alternatively, positioning devices 111 may include targets or reflectors for use with a laser-reflector device on total station 50 as described herein above.

In some embodiments, casing stub locator 101 may be a measurement-while-drilling (MWD) tool supported by stands 105.

Figure 3:
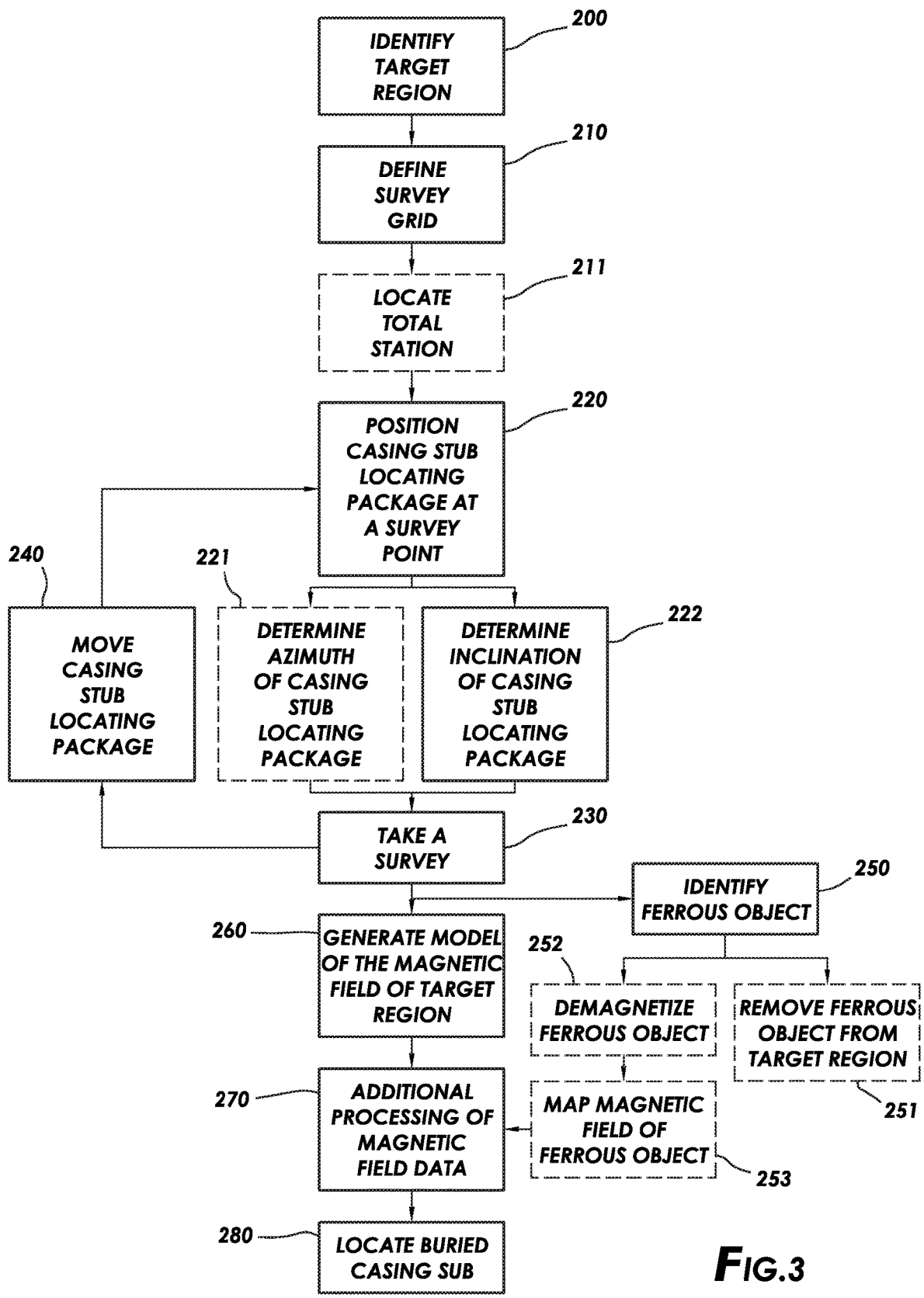
FIG. 3 depicts a flow chart of a surveying operation consistent with at least one embodiment of the present disclosure.

In operation, with reference to FIG. 3, when an intervention into a wellbore associated with buried casing stub 100 is desired, target region 10 may first be identified (200). Target region 10 may be identified using, for example and without limitation, historical drilling data associated with the wellbore associated with buried casing stub 100. Survey grid 12 of target region 10 may then be defined (210). In some embodiments, survey grid 12 may be defined using total station 50. In some such embodiments, total station 50 may be located within target region 10 (211) using, for example and without limitation, a differential GPS unit, Global Navigation Satellite System unit, or satellite navigation system receiver.

Figure 4:
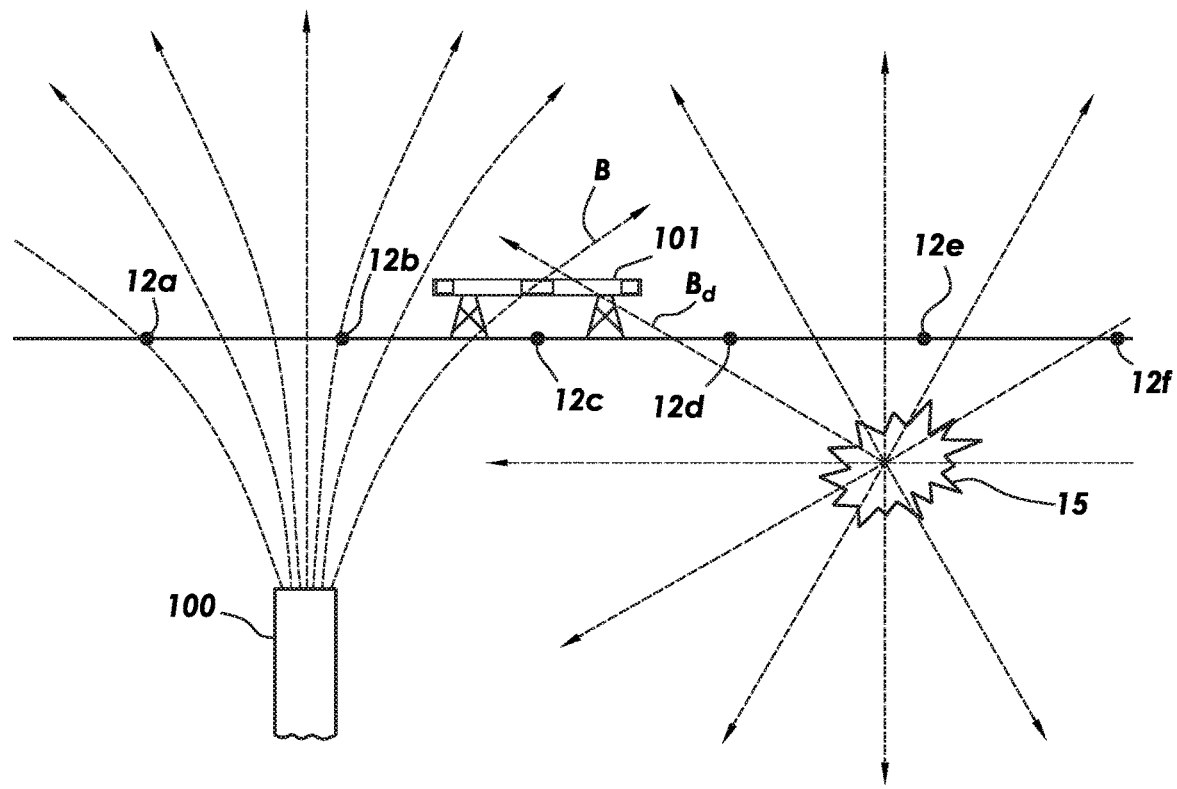
FIG. 4 depicts a side view of a surveying operation consistent with at least one embodiment of the present disclosure taken between points A1 and A2 of FIG. 1.

Casing stub locator 101 may then be positioned within target region 10 at a first survey point on survey grid 12 (220). In some embodiments, the location of casing stub locator 101 may be determined using total station 50. In some such embodiments, the azimuth 17 of casing stub locator 101 may be determined using total station 50 (221). In some embodiments, the inclination of casing stub locator 101 may be measured using accelerometers 109 (222). Casing stub locator 101 may then take a survey by measuring the local magnetic field at the survey point using vector magnetometer 107 (230). In some embodiments, casing stub locator 101 may then be moved to a different survey point on survey grid 12 (240). These operations may be repeated until a desired number of surveys are taken corresponding to survey grid 12. It will be understood that, while FIG. 4 depicts survey points arranged in a line for purposes of illustration, the survey points do not need to be arranged in a line and may be arrayed in a grid or any other desired configuration. It will further be understood that, rather than moving equipment to each desired survey point in sequence, surveys at two or more survey points may be taken simultaneously using multiple surveying devices, or surveys may be taken intermittently or continuously as the surveying device(s) is (are) moved continuously.

Figure 4A:
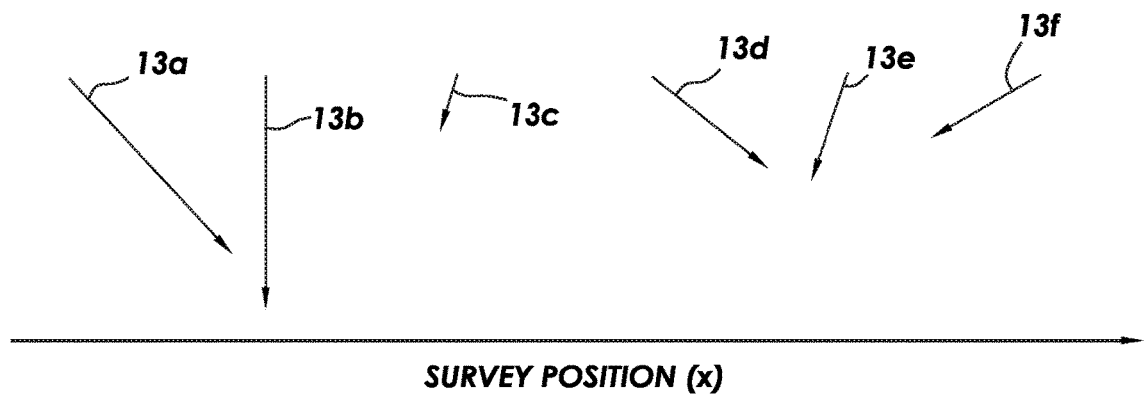
FIG. 4A depicts a representative magnetic vector map as measured by the casing stub locator along the surveying operation depicted in FIG. 4.

In some embodiments, during the surveying process, the magnetometer data collected by casing stub locator 101 may be affected by identify ferrous objects (250) other than buried casing stub 100. For example, as depicted in FIG. 4, a ferrous object, depicted as movable ferrous object 15, may be positioned on or under the surface in a position such that the magnetic perturbations Ba of movable ferrous object 15 may interfere with the detection of the magnetic anomaly B created by buried casing stub 100. Similarly, in some embodiments, the magnetic anomaly created by buried casing stub 100 may propagate as if buried casings tub 100 is a magnetic monopole or magnetic dipole as shown in FIG. 4. By reviewing the magnetometer data collected by casing stub locator 101 collected at multiple locations with the survey grid 12 and comparing each set of collected magnetometer data to the expected model, the perturbations in the magnetic field attributable to the movable ferrous object 15 may be identified. For example, as depicted in FIG. 4A, the vector magnetometer readings 13a-f (shown as 2-dimensional vectors) taken at survey points 12a-f (shown in FIG. 4) do not correspond with the expected vector magnetometer readings for a magnetic dipole.

Figure 5:
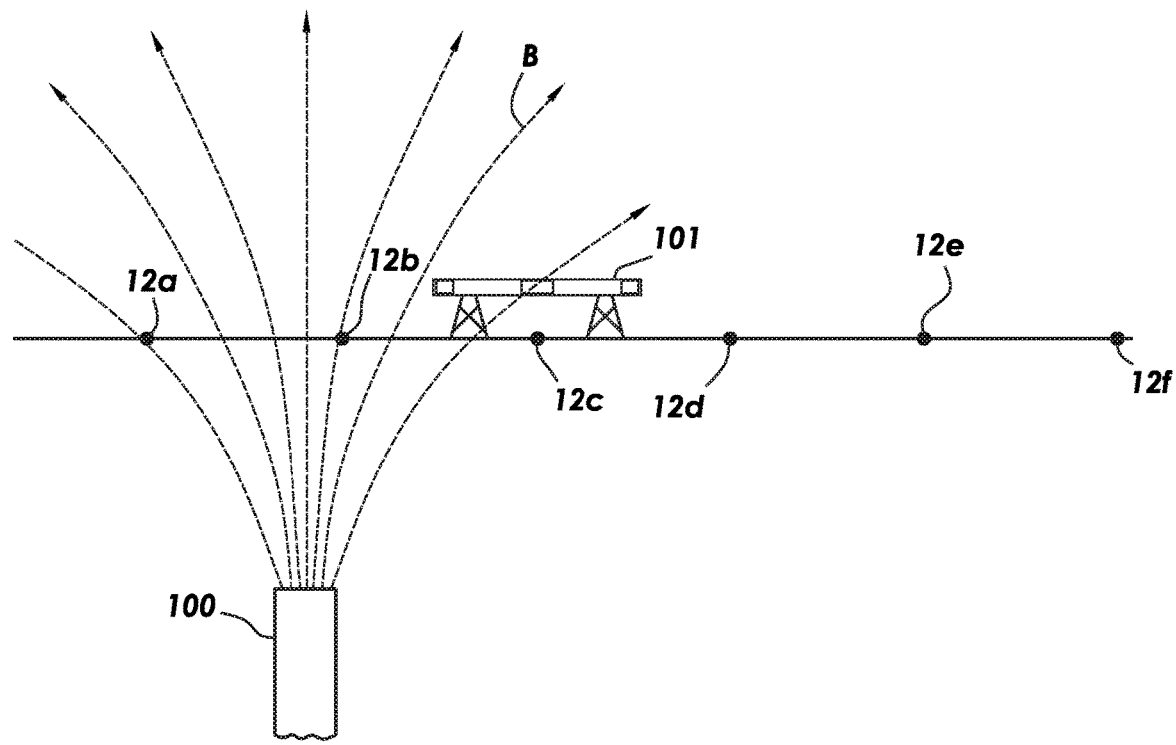
FIG. 5 depicts a side view of the surveying operation of FIG. 4 after removal of ferrous debris.
Figure 5A:
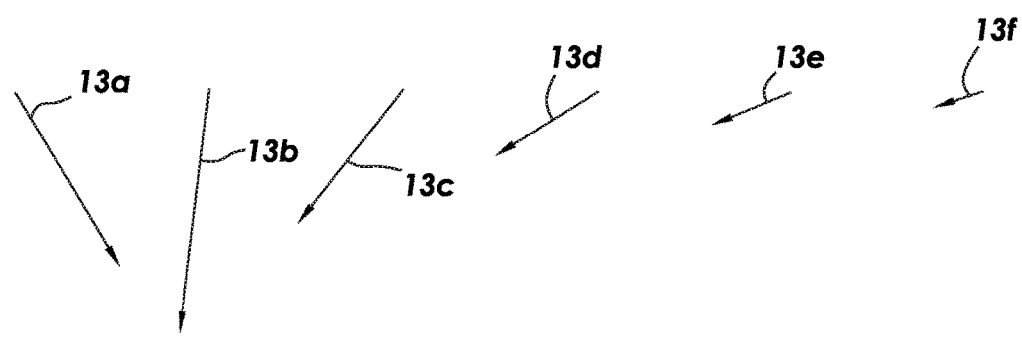
FIG. 5A depicts a representative magnetic vector map as measured by the casing stub locator along the surveying operation depicted in FIG. 5.

In such an instance, movable ferrous object 15 may be identified and, if possible, removed from target region 10 (251) as shown in FIG. 5. In embodiments in which movable ferrous object 15 can be removed, subsequent surveys taken at survey points 12a-f may result in magnetometer readings 13a-f collected by casing stub locator 101 that correspond more closely with those expected of a magnetic dipole as shown in FIG. 5A.

Figure 6:
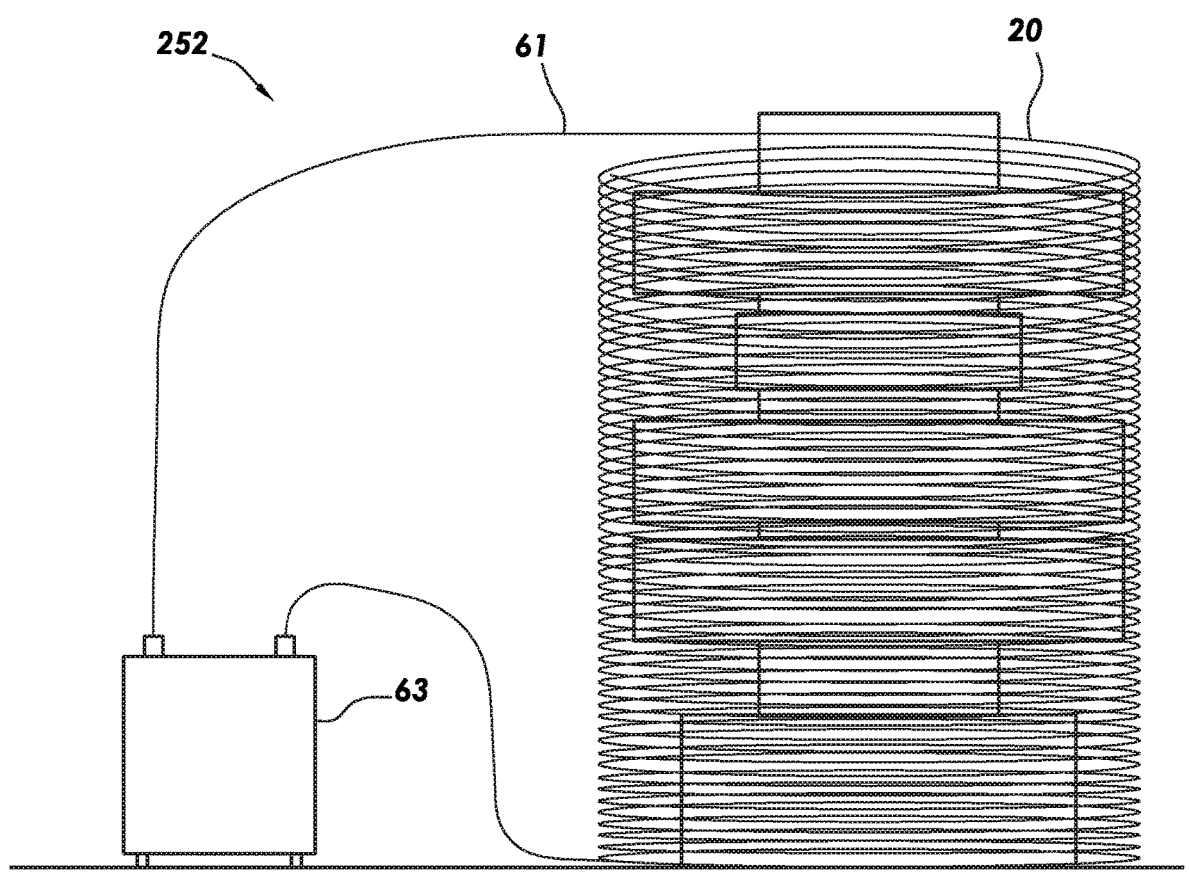
FIG. 6 depicts a demagnetization apparatus used to demagnetize a ferromagnetic object positioned in the target region.

In the case that the interference is caused by an object that cannot be moved, such as, for example and without limitation, where the object is unmovable ferrous object 20, the object may be demagnetized (252). In such a demagnetizing operation, as shown in FIG. 6, a wire 61 may be wrapped a number of times about unmovable ferrous object 20, here depicted as a steel wellhead. Current may be supplied to wire 61 by power source 63. In some embodiments, the current may be supplied at various frequencies and current levels at predetermined intervals for predetermined periods of time such that, without being bound to theory, the magnetic domains of the ferrous material are rearranged, resulting in a net lower magnetic field of unmovable ferrous object 20.

The magnetic field from unmovable ferrous object 20 can be mapped with the magnetometer/accelerometer package and referenced with the total station. This allows the magnetic field associated with unmovable ferrous object 20 to be characterized in 3D space. The magnetic field from unmovable ferrous objects 20 may then be mapped (253) using additional surveys taken by casing stub locator 101 such that the magnetic field of unmovable ferrous objects 20 may be characterized and taken into consideration when locating buried casing stub 100. In the case that additional ferrous objects are identified, such movable ferrous objects 15 or unmovable ferrous objects 20 may each in turn be handled as described above.

The grid collection of data from the 3 axis magnetometer can then be repeated over the expected buried casing stub of interest. The grid can change in latitude and departure and be repeated at different elevations to develop a "cube" of data.

During or after this surveying process, the magnetometer data collected by casing stub locator 101 may be used to generate a model of the magnetic field of target region 10 (260). The model may include the expected magnetic anomaly created by buried casing stub 100 as well as, for example and without limitation, the Earth magnetic field, crustal anomalies, and other identified magnetic sources as discussed above. In some embodiments, additional processing may be undertaken on the magnetic field data (270).

Figure 7:
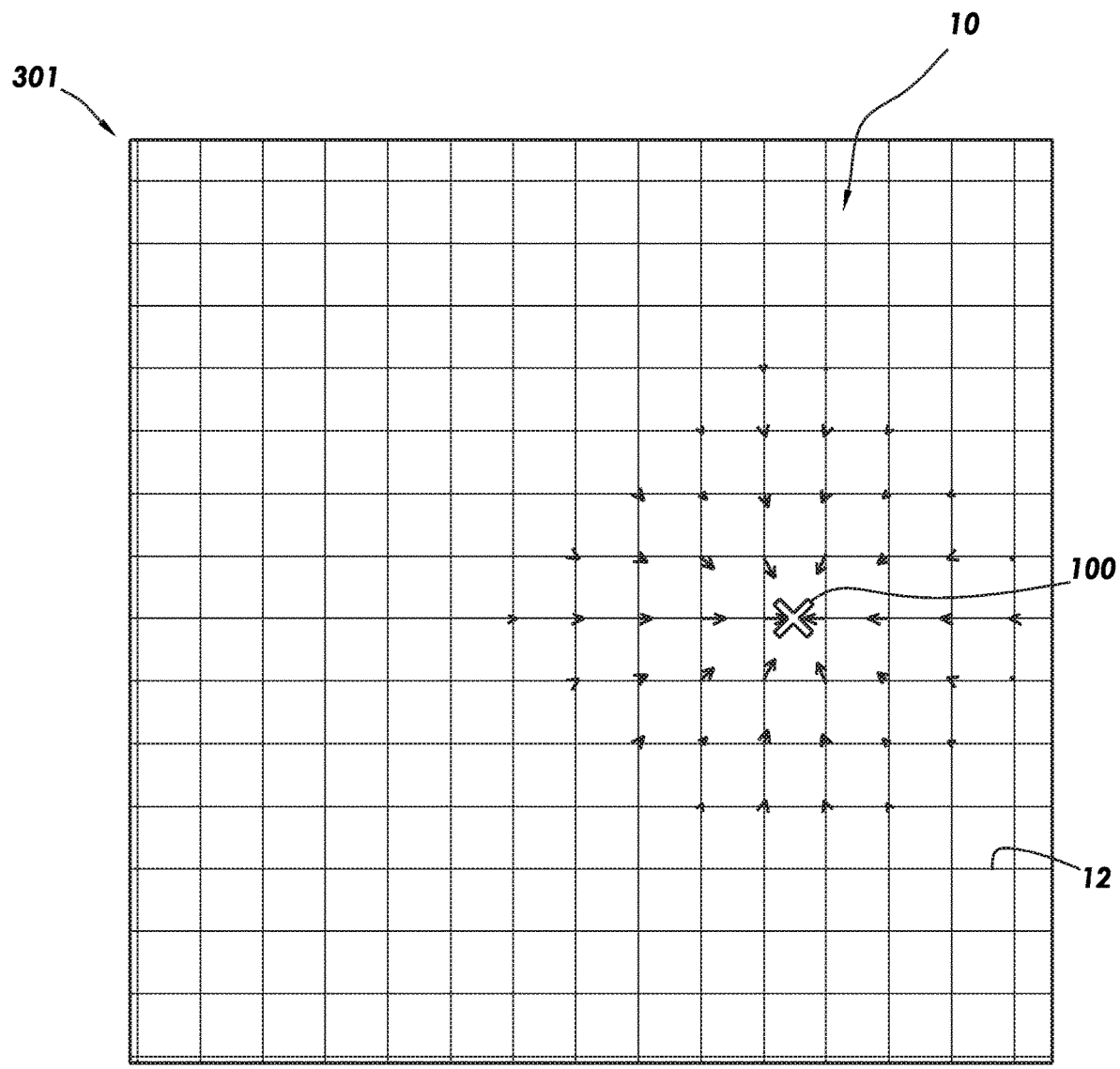
FIG. 7 depicts a top view of a magnetic perturbation map as measured by the casing stub locator representing the target region depicted in FIG. 1.

For example, in some embodiments, the knowledge of the position of casing stub locator 101 at each survey point as well as the inclination and azimuth thereof may allow the expected Earth magnetic field components of the measured magnetic field to be determined based on the expected magnetic field at the position, inclination, and azimuth of casing stub locator 101, and therefore may be subtracted from the magnetic field data. The model of the magnetic anomaly—depicted two-dimensionally from the top in FIG. 7 as model 301—created by buried casing stub 100 may then be generated and may be used to locate buried casing stub 100 (280). In some such embodiments, the model of the magnetic field of target region 10 may be fit to an expected model of the magnetic anomaly created by buried casing stub 100, such as a magnetic monopole or magnetic dipole. In some embodiments, because casing stub locator 101 uses vector magnetometer 107, both the position and the depth of buried casing stub 100 may be determined.

In some embodiments, a model of buried casing stub 100 may be generated and fit using scalar magnetometer readings.

In some embodiments, buried casing stub 100 may be located without the use of total station 50. In such an embodiment, a fit based on horizontal and vertical magnetometer readings alone may be used to identify a difference between the observed magnetic fields and the expected background reference model. In other such embodiments, casing stub locator 101 may be aligned visually to an external reference to provide a full three-dimensional model, though error may be introduced due to inaccuracy of the positioning of casing stub locator 101.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the scope of the present disclosure and that they may make various changes, substitutions, and alterations herein without departing from the spirit and scope of the present disclosure. Likewise, unless explicitly so indicated, the sequential recitation of steps in the claims that follow is not intended to be a requirement that the steps be performed sequentially.

The invention claimed is:

1. A method for locating a buried casing stub comprising:
   a) identifying a target region for the buried casing stub;
   b) providing a casing stub locator at each of a plurality of surface survey points in the target region, the casing stub locator including a vector magnetometer, the casing sub locator positioned at the surface of the earth;
   c) providing a total station in the target region, wherein the total station has a line of sight to the casing stub locator and determining the location of the total station;
   d) using the vector magnetometer to measure the magnitude and direction of the magnetic field at each of the plurality of surface survey points so as to generate a plurality of magnetic field measurements;
   e) for each survey point: determining an azimuth relative to true north of the casing stub locator, using the azimuth relative to true north of the casing stub locator and position of the casing stub locator to determine expected Earth magnetic field components of the measured magnetic field at that survey point, and subtracting the Earth magnetic field components from the measured magnetic field at that survey point, wherein at least one of the azimuth and position of the casing stub locator is measured using the total station;
   f) using the plurality of magnetic field measurements to generate a model of the magnetic field of the target region;
   g) fitting the model generated in step f) to an expected model of a magnetic anomaly created by the casing stub so as to generate model fit information; and
   h) determining the position and the depth of the casing stub using the model fit information.

2. The method of claim 1, further comprising:
   defining a survey grid within the target region;
   moving a casing stub locator to each point of the survey grid; and
   measuring the magnetic field with the vector magnetometer at each point of the survey grid.

3. The method of claim 1, further comprising:
   determining the location of the total station in the target region using a positioning device selected from the group consisting of differential Global Positioning System (GPS) units, Global Navigation Satellite System units, and satellite navigation system receivers.

4. The method of claim 1, wherein the azimuth relative to true north of the casing stub locator is determined by visually aligning the casing stub locator to an external reference.

5. The method of claim 1, wherein the casing stub locator further comprises one or more positioning devices adapted to locate a casing stub locating package within the target region and determine the azimuth of casing stub locator.

6. The method of claim 5 wherein the positioning device is selected from the group consisting of differential GPS units, Global Navigation Satellite System units, and satellite navigation system receivers.

7. The method of claim 1 wherein the casing stub locator further comprises an accelerometer, and the method further comprises:
   determining the inclination of the casing stub locator with the accelerometer.

8. The method of claim 1, further comprising:
   identifying a ferrous object in proximity to the casing stub locator by comparing the measured magnetic field to an estimated magnetic field of the casing stub; and
   removing the ferrous object from the target region.

9. The method of claim 1, further comprising:
   identifying a ferrous object within detectible proximity of the casing stub locator by comparing the measured magnetic field to an estimated magnetic field of the casing stub;
   wrapping a wire around the ferrous object;
   connecting the wire to a current source; and
   demagnetizing the ferrous object by passing a current through the wire.

10. The method of claim 9, further comprising:
    measuring the magnetic field with the magnetometer in proximity to the demagnetized ferrous object; and
    including the measurement made in proximity to the demagnetized ferrous object in the model generated in step f).

11. A method for locating a buried casing stub comprising:
    a) identifying a target region for the buried casing stub;
    b) defining a survey grid comprising a plurality of surface survey point within the target region;
    c) providing a casing stub locator, the casing stub locator including a vector magnetometer, the casing stub locator positioned on the surface of the earth;
    d) providing a total station in the target region, wherein the total station has a line of sight to the casing stub locator
    e) moving the casing stub locator to each the surface survey points and, at each of the plurality of surface survey points;
       e1) measuring the magnitude and direction of the magnetic field using the vector magnetometer so as to generate a plurality of magnetic field measurements; and
       e2) using the total station to measure at least one of the positon of the casing stub locator or the azimuth relative to true north of the casing stub locator;
    f) using the plurality of magnetic field measurements to generate a model of the magnetic field of the target region;
    g) fitting the model generated in step d) to a selected model of a magnetic anomaly created by the casing stub so as to generate model fit information, wherein fitting the model includes the steps of:
       1) at each surface survey point, determining an azimuth relative to true north of the casing stub locator; and
       2) using the azimuth and position of the casing stub locator to determine expected Earth magnetic field components of the measured magnetic field at the measurement location and subtracting the Earth magnetic field components from the measured magnetic field at the measurement location; and h) determining the position and the depth of the casing stub using the model fit information.

12. The method of claim 11, wherein the casing stub locator further comprises an accelerometer, wherein step g1) further includes determining the inclination of the casing stub locator with the accelerometer and step g2) further includes using the inclination of the casing sub locator to determine expected Earth magnetic field components of the measured magnetic field at the measurement location.

13. The method of claim 11, further comprising:

identifying a ferrous object in proximity to the casing stub locator by comparing the measured magnetic field to an estimated magnetic field of the casing stub and reducing the effect of the ferrous object on the measured magnetic field.

14. The method of claim 13, further comprising the steps of:

measuring the magnetic field with the magnetometer in proximity to the ferrous object and including the measurement made in proximity to the ferrous object in the model generated in step f).

\* \* \* \* \*

UNITED STATES PATENT AND TRADEMARK OFFICE
CERTIFICATE OF CORRECTION

PATENT NO. : 11,243,323 B2
APPLICATION NO. : 16/525109
DATED : February 8, 2022
INVENTOR(S) : Moss et al.

It is certified that error appears in the above-identified patent and that said Letters Patent is hereby corrected as shown below:

In the Claims

Claim 11, Column 8, Line 37:
"survey point within the target region;"
Should read:
"survey points within the target region;"

Claim 11, Column 8, Line 52:
"positon of the casing stub locator or the azimuth"
Should read:
"position of the casing stub locator or the azimuth"

Signed and Sealed this
Fifth Day of April, 2022

Drew Hirshfeld
*Performing the Functions and Duties of the
Under Secretary of Commerce for Intellectual Property and
Director of the United States Patent and Trademark Office*